US010223915B2

(12) United States Patent
Haines et al.

(10) Patent No.: US 10,223,915 B2
(45) Date of Patent: Mar. 5, 2019

(54) SYSTEM THAT WARNS IN ADVANCE OF OCCUPANTS EXITING OR ENTERING A PARKED VEHICLE

(76) Inventors: Russell Haines, Beijing (CN); Cory Grenier, Beijing (CN)

( * ) Notice: Subject to any disclaimer, the term of this patent is extended or adjusted under 35 U.S.C. 154(b) by 520 days.

(21) Appl. No.: 13/016,965

(22) Filed: Jan. 29, 2011

(65) Prior Publication Data

US 2012/0194356 A1     Aug. 2, 2012

(51) Int. Cl.
*B60Q 1/32*     (2006.01)
*B60Q 1/52*     (2006.01)
*B60Q 9/00*     (2006.01)
*G08G 1/16*     (2006.01)

(52) U.S. Cl.
CPC ............ *G08G 1/161* (2013.01); *B60Q 1/323* (2013.01); *B60Q 9/008* (2013.01); *B60Q 1/52* (2013.01); *B60Q 1/525* (2013.01); *B60Q 2400/40* (2013.01); *B60Q 2400/50* (2013.01); *G08G 1/166* (2013.01)

(58) Field of Classification Search
CPC ........ B60Q 2400/50; B60Q 1/50; B60Q 1/52; B60Q 1/323; B60R 21/013; B60R 21/0134
See application file for complete search history.

(56) References Cited

U.S. PATENT DOCUMENTS

| | | | | |
|---|---|---|---|---|
| 4,663,626 A * | 5/1987 | Smith | ................ | G07C 9/00182 340/12.2 |
| 4,965,546 A * | 10/1990 | Chang | .......................... | 340/468 |
| 5,467,071 A * | 11/1995 | Koenig | .......................... | 340/433 |
| 5,612,668 A * | 3/1997 | Scott | ................... | B60R 25/1012 340/426.13 |
| 5,923,243 A * | 7/1999 | Bleiner | ................. | B60Q 1/525 340/435 |
| 5,969,603 A * | 10/1999 | Wang | ............................ | 340/471 |
| 6,323,566 B1 * | 11/2001 | Meier | ................ | G07C 9/00309 180/287 |
| 6,685,347 B2 | 2/2004 | Grutze | | |
| 6,718,240 B1 * | 4/2004 | Suda | .................... | B60N 2/0248 318/480 |
| 6,733,134 B2 * | 5/2004 | Bleiner | .......................... | 353/13 |
| 7,192,172 B1 * | 3/2007 | Alberti | ................. | B60Q 1/2665 362/259 |
| 7,455,139 B2 * | 11/2008 | Lee | ...................... | B60Q 1/2673 180/167 |
| 7,528,704 B2 * | 5/2009 | Das | ....................... | B60R 21/013 296/146.1 |

(Continued)

*Primary Examiner* — Steven Lim
*Assistant Examiner* — Muhammad Adnan
(74) *Attorney, Agent, or Firm* — Patent Service Associates; Lyman Smith

(57) ABSTRACT

A system for protecting the safety of occupants exiting and entering a vehicle is disclosed. The system has sensors on the interior, exterior and remotely of the vehicle and one or more imaging devices that project an image onto the pavement supporting the vehicle as well as optional data input devices all communicating with a system controller. The system anticipates that the occupant will be leaving the vehicle and the time it will take for the occupant to fully exit the vehicle. The system further controls the imaging devices to warn the drivers of oncoming traffic of the occupant's egress and warn or block the egress of the occupant should a particularly dangerous condition exist.

18 Claims, 4 Drawing Sheets

(56) References Cited

U.S. PATENT DOCUMENTS

Figure 1:
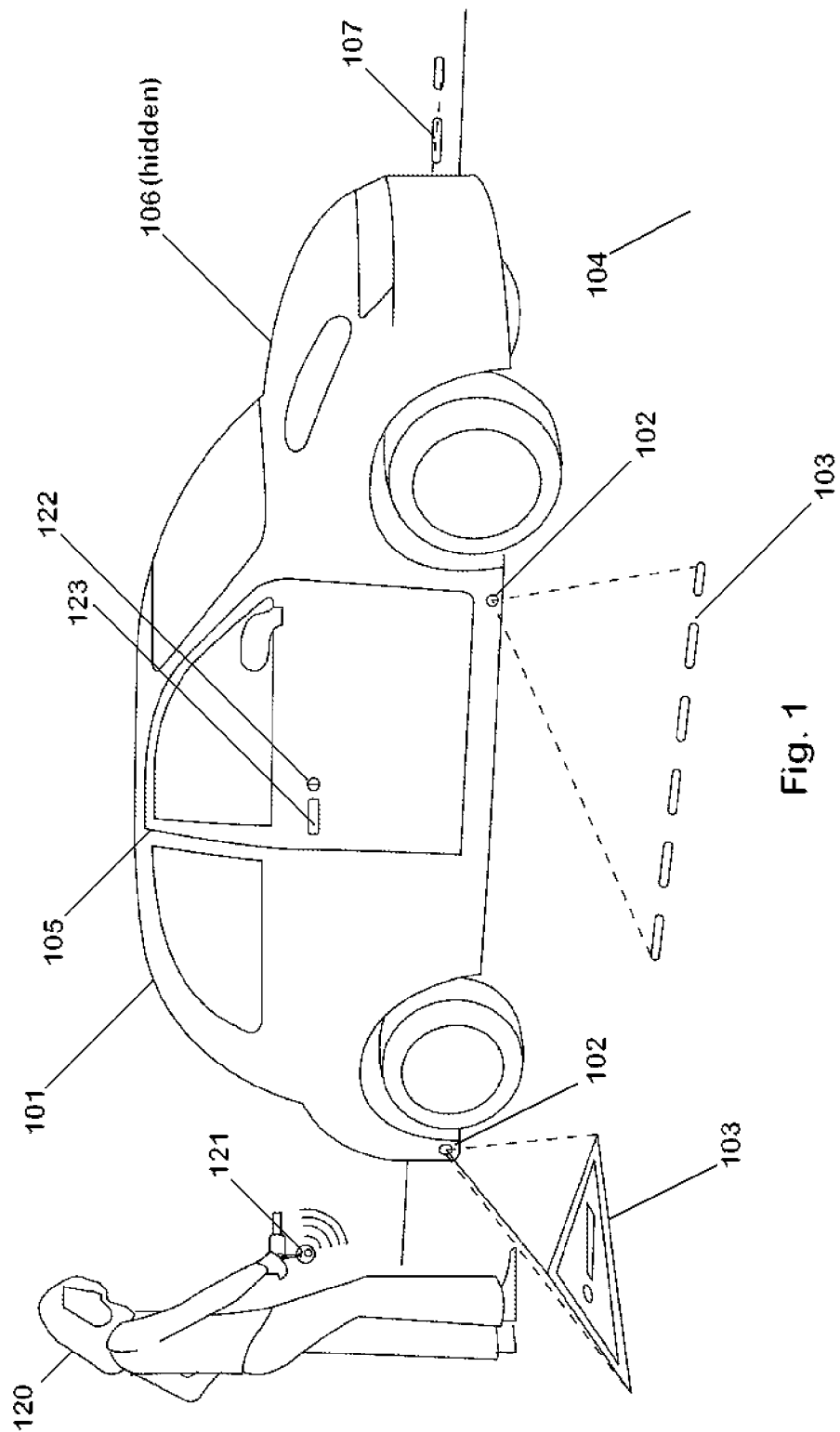

| | | | | |
|---|---|---|---|---|
| 8,182,125 B2* | 5/2012 | Englander | ............... | B60Q 1/24 |
| | | | | 362/478 |
| 8,325,027 B2* | 12/2012 | Tee et al. | ....................... | 340/432 |
| 8,325,029 B2* | 12/2012 | Brooking | ............. | B60Q 1/2611 |
| | | | | 340/463 |
| 8,554,422 B2* | 10/2013 | Kneller | .................. | B64D 11/00 |
| | | | | 244/118.6 |
| 8,836,491 B2* | 9/2014 | Rao | ........................ | B60K 28/08 |
| | | | | 340/426.13 |
| 9,511,730 B1* | 12/2016 | Wu | ........................ | G08G 1/166 |
| 9,710,063 B2* | 7/2017 | Levesque | ................ | G06F 3/016 |
| 2004/0041983 A1* | 3/2004 | Bleiner | .................... | B60Q 1/52 |
| | | | | 353/13 |
| 2004/0145496 A1 | 7/2004 | Ellis | | |
| 2005/0261815 A1* | 11/2005 | Cowelchuk | ............. | B60Q 5/00 |
| | | | | 701/36 |
| 2006/0254142 A1* | 11/2006 | Das | ....................... | B60R 21/013 |
| | | | | 49/26 |
| 2007/0188312 A1* | 8/2007 | Bihler | .................... | B60Q 9/008 |
| | | | | 340/435 |
| 2009/0000778 A1* | 1/2009 | Nathan | .............. | B60H 1/00735 |
| | | | | 165/202 |
| 2009/0058829 A1* | 3/2009 | Kim | ........................ | G06F 3/016 |
| | | | | 345/173 |
| 2009/0174540 A1* | 7/2009 | Smith | .......................... | 340/465 |
| 2011/0156889 A1* | 6/2011 | Liao | ........................ | B60Q 7/00 |
| | | | | 340/435 |
| 2011/0307146 A1* | 12/2011 | Yang et al. | ..................... | 701/36 |
| 2012/0053793 A1* | 3/2012 | Sala | ....................... | B60N 2/002 |
| | | | | 701/45 |
| 2012/0065858 A1* | 3/2012 | Nickolaou et al. | ............. | 701/70 |

* cited by examiner

SYSTEM THAT WARNS IN ADVANCE OF OCCUPANTS EXITING OR ENTERING A PARKED VEHICLE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND

More than 1.2 million people loose their lives in traffic accidents world wide per the "2009 Global Status Report on Road Safety" published by the "World Health Organization". The popularity of family vehicles that are equipped with advanced safety systems is an indication of a healthy public demand for vehicles that prevent their owners from becoming a traffic statistic. The present invention addresses these demands by offering a significant step forward in the field of protecting drivers and passengers during the very vulnerable period of entering or exiting their vehicles. Presently marketed vehicle door edge lights sold for the purpose of warning oncoming traffic of an occupant entering or exiting a vehicle do not address the problems of the short warning time given by the few seconds it takes to swing a door open versus the time to maneuver a two ton vehicle in traffic to avoid striking a person entering or exiting a vehicle. The present invention also addresses the additional risk posed by increasing sales of vehicles into cramped urban environments, such as China and India, where visibility of small door edge lights may be lost in the myriad of distracting light sources and may not allow a driver in oncoming traffic the time to respond to the danger of the driver or passenger of a stopped vehicle exiting onto the crowded high speed highways of Europe or America.

PRIOR ART

The following is art is representative of what is published in the field of vehicle warning devices:

U.S. Pat. No. 6,685,347 to inventor Grutze discloses a vehicle convenience and brand identification device that projects, graphic images on the pavement to guide the foot placement of person entering or exiting a stopped vehicle. However, the disclosure of inventor Grutze lacks a solution to the problems warning traffic of a person entering or exiting a stopped vehicle in advance, controlled by a smart system that anticipates occupant egress in response to signals form internal sensors and evaluates the risk of exiting the vehicle based on exterior and remote inputs and prevents the occupant from leaving the vehicle should eminent danger be anticipated.

U.S. Pat. No. 7,192,172 to inventor Alberti discloses a vehicle safety device that projects, simple geometric images on the pavement to warn traffic of an area for traffic to avoid. However, the disclosure of inventor Alberti lacks a solution to the problems of projecting, graphic images on pavement that are specifically recognized to warn traffic of a person entering the line of traffic. Nor do the teachings of Alberti disclose a smart system that anticipates occupant egress in response to signals form internal sensors and evaluates the risk of exiting the vehicle based on exterior and remote inputs and prevents the occupant from leaving the vehicle should eminent danger be anticipated.

US Patent Application Number US 2004/0145496 to applicant Ellis discloses a intelligent vehicle that has a smart system connected to a variety of sensors and warning devices inside and outside of the vehicle that learns the best actions to take based on system stimuli over a period of time. However, the disclosure of applicant Ellis lacks a solution to the problems of protecting occupants when entering or exiting the vehicle by projecting graphic images on the pavement in advance to warn traffic of a person entering or exiting a stopped vehicle controlled by a smart system wherein the smart system anticipates occupant egress in response to signals form internal sensors and evaluates the risk of exiting the vehicle based on exterior and remote sensors and prevents the occupant from leaving the vehicle should eminent danger be anticipated.

U.S. Pat. No. 6,733,134 to inventor Bleiner discloses a visual signaling device that is adapted to a moving vehicle to project traffic condition warnings to the driver of a trailing vehicle as such it projects, graphic images to warn following traffic. However, the disclosure of inventor Bleiner lacks a solution to the problems of protecting occupants either entering or exiting vehicles by projecting, graphic images on the pavement in advance controlled by a smart system that anticipates occupant egress in response to signals form internal sensors and evaluates the risk of exiting the vehicle based on exterior and remote input and prevents the occupant from leaving the vehicle should eminent danger be anticipated.

None of the above Patents or Published Patent Applications singly or in combination is seen to describe the present invention as claimed.

BRIEF SUMMARY OF THE INVENTION

The basic problem to be solved is to preserve the life of a person entering or exiting a vehicle in the presence of traffic is to address four issues: The first issue is to alert the traffic of the eminent risk of a person entering traffic in advance with a readily distinguishable warning. The second is to time the initiation of the warning neither too soon before the person emerges into traffic nor too late for the oncoming traffic to respond and avoid contact without swerving into another lane. The third is to adjust the timing of the advanced warning based on external inputs related to traffic conditions and conditions of the roadway. The fourth issue is to stop the person from entering traffic when for any reason the danger of injury or death is too great.

The preferred embodiment of the instant invention addresses the first issue by use of a visible signal projected on the largest surface to be found, the pavement. The visibility of the warning can be enhanced by image movement, graphics sensitive to the cultural or language preferences in the locality of the vehicle. Changing, the image, flashing color change or movement of the warning image may be used to further enhance the effectiveness of the warning. The second issue of timing is tricky because a person can grab the door handle and thrust the door open far faster than a vehicle at modest speed can change course to avoid the vehicle door and the person to follow. The preferred embodiment of the present invention addresses the second issue by anticipating when a person is going to exit the vehicle based on the actions that the person habitually makes preceding their egress. Actions prior to leaving the car could be turning off the ignition, releasing the seat belt, touching the visor mirror to check makeup, setting the brake, lighting or extinguishing a cigarette, simply moving their hand in proximity of the door handle or many other actions that can act as stimuli to a smart control system. Once more the smart control system can learn that these stimuli may be repeatedly triggered at a time before the ideal time to alert traffic to an egress and a delay may be introduced by the system to compensate for the disparity. The smart control system may also be constructed to distinguish between drivers by physical sensors, seat or other adjustments made by the driver, biometrics or any other means as each driver could exercise different habits prior to exiting the vehicle. The third issue is one of compensating for the conditions of the road and the traffic to adequately protect the occupant entering or exiting the vehicle. Sensors for ambient light, precipitation, proximity to the traffic, speed, direction and volume of the traffic all offer the potential for a smart system to estimate the danger of opening a door and emerging into traffic. Remote sources of data that influence the safety of entering or exiting a vehicle 101 can be communicated form satellites (un-shown) weather broadcasts, police broadcasts, from other vehicles, GPS and WAVE, V2V. The fourth issue is warning and or blocking the vehicle occupant from exiting in cases of high risk.

The primary object of the present invention is to reduce the risk of being struck by oncoming traffic when exiting or entering a vehicle:

A further object of the present invention is to provide a warning to drivers of approaching vehicles that anticipates an occupant is about to or is in the process of exiting a parked vehicle;

It is a further object of the present invention to project a visible image on the driving pavement as the warning mechanism;

A further object of the present invention is to outline a danger zone on the pavement;

A further object of the present invention is to project a moving visible image on the pavement;

A further object of the present invention is to automatically change the image projected on the pavement due to a particular circumstance;

A further object of the present invention is to project a customizable image on the pavement;

A further object of the present invention is to incorporate a microprocessor in the control system of the device;

A further object of the present invention is to warn the occupant of a particularly dangerous condition should the occupant choose to exit the vehicle;

A further object of the present invention is to make the danger warning apparent to the occupant by one or any combination of sound, visible or vibratory means;

A further object of the present invention is to prevent the occupant from exiting the vehicle when a particularly dangerous condition exists;

A further object of the present invention is to consider insufficient warning time to drivers of oncoming vehicles a particularly dangerous condition;

A further object of the present invention is to predict that an occupant of a vehicle is about to exit the vehicle;

A further object of the present invention is to initiate the warning to drivers of oncoming vehicles based on the prediction of the occupant exiting;

A further object of the present invention is to predict the time it takes for an occupant to exit the vehicle;

A further object of the present invention is to predict the time it will take for oncoming vehicles to reach the parked vehicle;

A further object of the present invention is to consider insufficient time for the occupant of the parked vehicle to fully exit the vehicle before oncoming traffic reaches the vehicle a particularly dangerous condition;

A further object of the present invention to make predictions that an occupant will exit a vehicle and the time it will take based on a weighting factor; a further object of the present invention to alter the waiting factors based on actual measurements of the occupants physical movements;

a further object of the present invention is for the vehicle to measure the speed and distance of oncoming traffic and consider these factors in the operation of the warning system, a further object of the present invention is to utilize Wireless Access in Vehicular Environments (WAVE) for vehicle to vehicle (V2V) communication to gain vehicle speed and proximity information;

a further object of the present invention is to consider road conditions and traffic conditions on the time necessary to appropriately warn oncoming traffic of an emerging pedestrian;

a further object is to prevent the occupant from leaving the vehicle under extreme conditions;

a further object of the invention is to integrate occupant input experience with a particular vehicle model in combination with gathered occupant input with a particular occupant in the choice of occupant inouts to be used to trigger the alarm system;

a last object of the present invention is to provide the occupant an emergency override of the egress preventing function of the system.

BRIEF DESCRIPTION OF THE SEVERAL VIEWS OF THE DRAWING(S)

FIG. 1: Is a perspective view of a vehicle projecting a warning image of the present invention.

Figure 2:
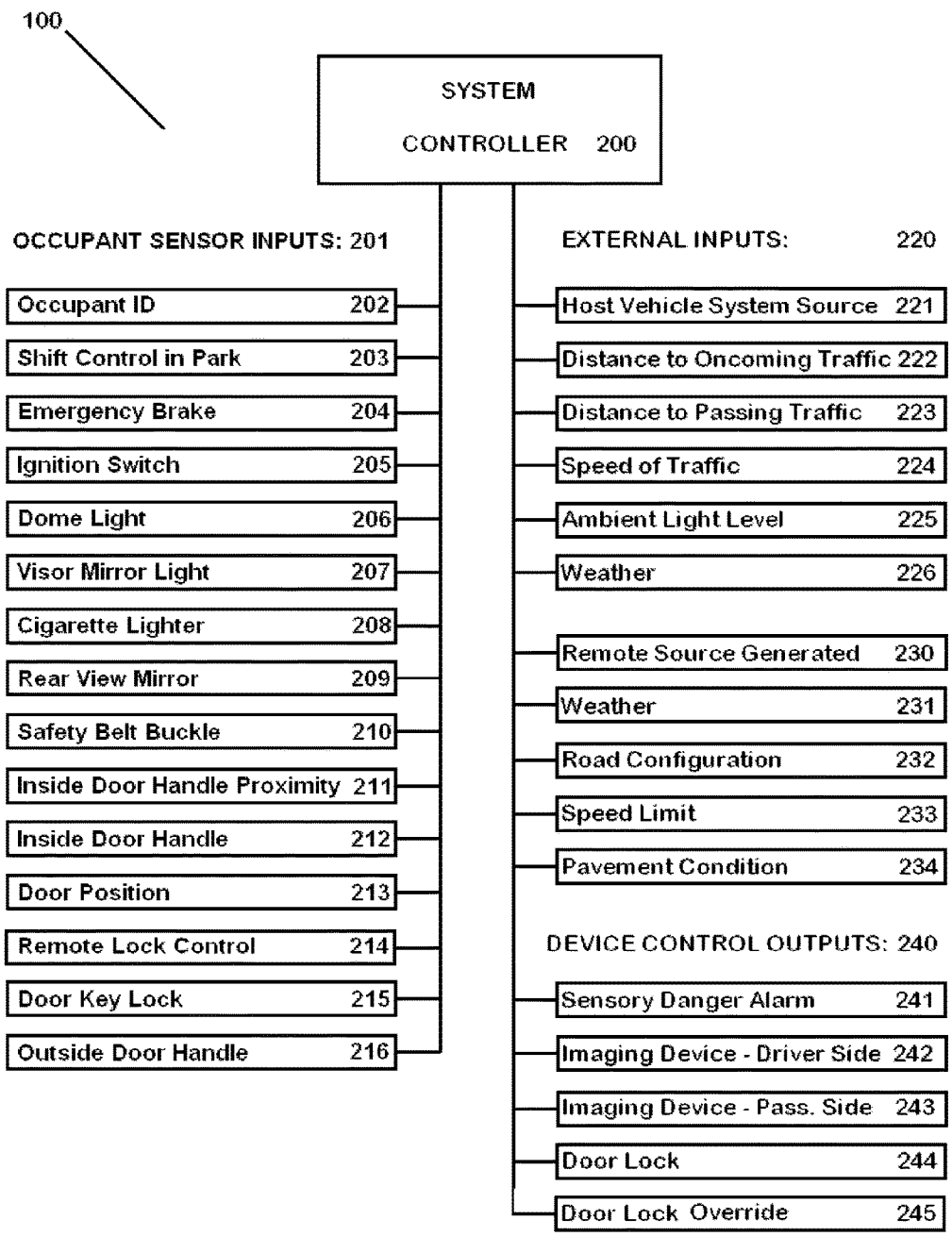

FIG. 2: Is a system block diagram of the present invention.

Figure 3:
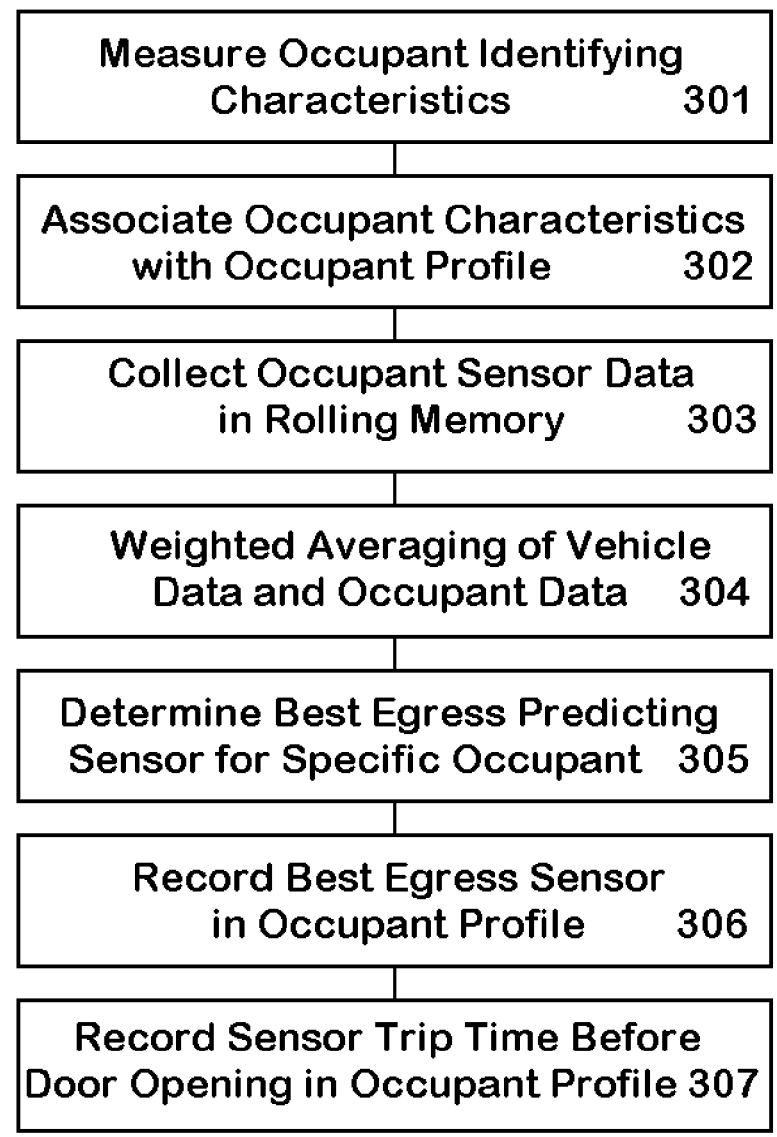

FIG. 3: Is a system Learning Cycle Block Diagram.

Figure 4:
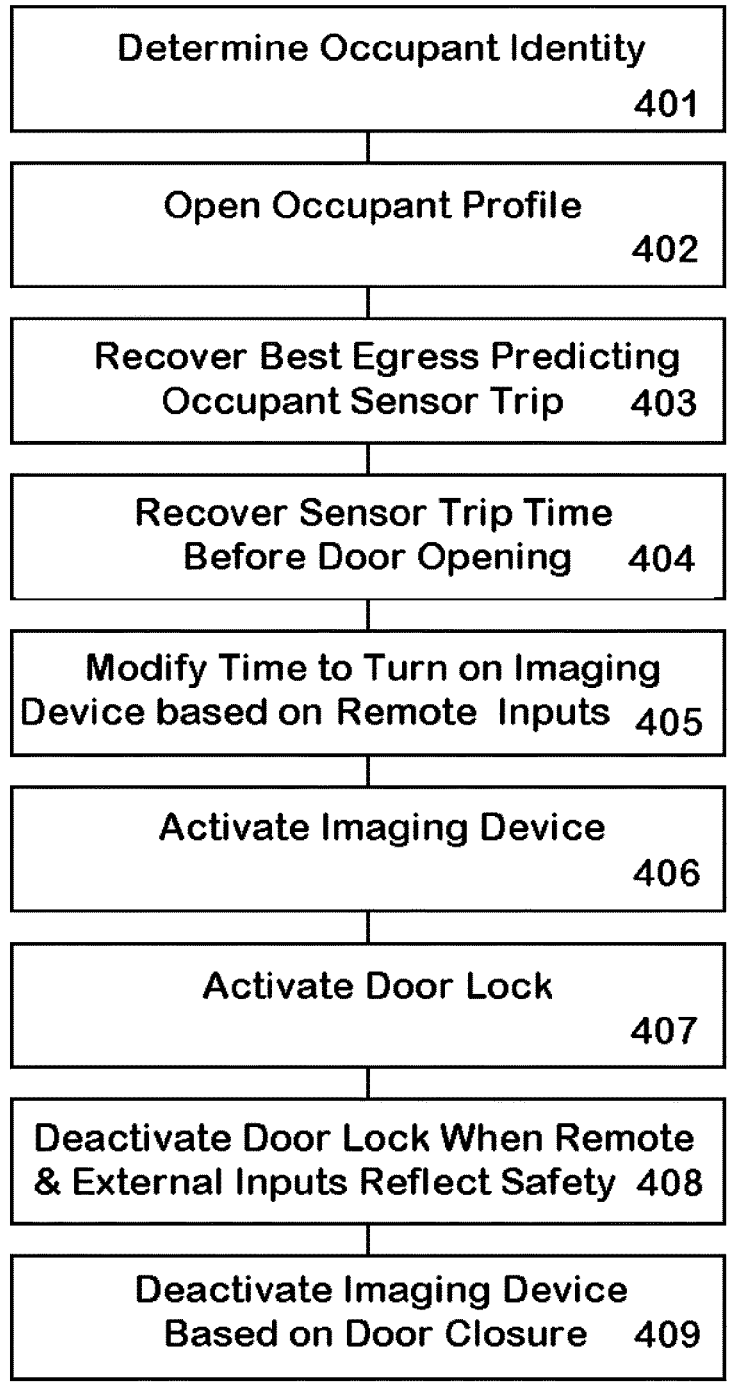

FIG. 4: Is a system Operating Cycle Block Diagram.

DETAILED DESCRIPTION OF THE INVENTION

FIG. 1 is a conceptual drawing of the instant invention adapted to protect the occupants (un-shown) of an automobile 101 when entering or exiting the automobile 101. A first imaging device 102, projects a first imaging 103, on the pavement 104, to warn oncoming traffic (un-shown) of the vehicle's driver (un-shown) who is about to open the automobile driver's door 105, and emerge from the automobile 101, and onto the pavement 104.

FIG. 1 also shows examples of additional imaging devices 106, that project additional images 107, on the pavement 104, when additional occupants (un-shown) are about to egress from additional doors 108 of the automobile 101. This publication uses an example of an automobile 101 adapted with the instant invention. However, a broad spectrum of vehicles can be so adapted, for example, vans, recreational vehicles, racing vehicles, trucks, construction vehicles, amusement park, train, boats, amphibious craft, and aircraft, as well as toys, models or any other likeness of these vehicle designs.

FIG. 1 also shows a remote door lock control 121, that is used by a pedestrian (un-shown) to activate the present invention 100 when intending to enter the automobile 101. Alternatively, the present invention 100 could be activated by a sensor in the door key lock 122, a sensor of the outside door handle 123 or a proximity sensor (un-shown).

FIG. 2 shows a block diagram of the instant invention 100, including a controller 200, that is electrically, wirelessly or otherwise connected to receive a series of occupant sensor inputs 201, inputs from sources on the outside of the host vehicle 220, input received from sources remote from the host vehicle and reaction from the controller either electrically, wirelessly or otherwise remotely connected to the controlled device 240.

The first category of devices in FIG. 2, that are attached to the controller 200 are sensors that detect the actions of the occupants of the vehicle. The Occupant ID sensor 202 is intended to distinguish between various occupants of the vehicle. In its simplest form the occupant ID sensor 202 could measure the weight of the occupant, however, biometric, physical size, RFID key chain identifiers, voice recognition Etc. are examples of devices that could also serve this purpose. The remainder of the occupant sensor inputs 201 are intended to sense the occupants preparation for exiting the vehicle 101 including: placing the shift control in park 203, setting the emergency brake 204, turning off the ignition switch 205, checking ones belongings or appearance by use of the dome light 206, visor mirror light 207, cigarette lighter 208, rear view mirror redirection 209, or the more direct preparations for exiting of releasing the safety belt buckle 210, moving ones hand in closer proximity to the door handle proximity sensor 211 or touch or movement of the inside door handle 212. The door position sensor 213 is used to time the turning off of the imaging device.

The three remaining sensors of FIG. 2 are for controlling the instant invention 100 by an occupant wishing to enter the vehicle 101 as shown in FIG. 1. A remote lock control 214 is much like the key chain carried lock control currently sold to the automobile market. The instant invention 100 could also be activated by movement of the door key lock 215 or outside door handle 216.

The external inputs 220, from a host vehicle system source 221 to the controller 200, of FIG. 2, provide vital information that affects occupant safety when entering or exiting a vehicle 101. The first group of external inputs 220 could be from sensors 221 adapted to the outside of the vehicle 101. Radar, optical Doppler affect measurement, two way communication with oncoming traffic or proximity sensors could generate the distance between the vehicle and oncoming traffic in the travel direction 222, the transverse proximity of the traffic to the vehicle 223, the speed of the oncoming traffic 224 the outside ambient light level 225 and weather conditions 226 such as temperature (un-shown) or precipitation (un-shown) all return a measure of occupant safety during entry or exiting the vehicle 101. Some or all of the external inputs 220 could also be transmitted to the controller of the instant invention through Wireless Access in Vehicular Environments (WAVE) for vehicle to vehicle (V2V) communication which is an initiative of the Intelligent Transportation Society of America (ITSA).

The remote source generated 230 information that could be gotten with satellite, cellular or direct wireless communication including GPS, 3G, 4G network, vehicle to vehicle or vehicle to land station systems can also supply weather 231, road configuration 232 (number of lanes, intersections Etc.), speed limit 233 and pavement condition 234, (wet, icy, pot holes, resurface milling Etc.) that again are considerations in providing for safe occupant entering or exiting the vehicle 101.

All or some of the aforementioned inputs in FIG. 2 can be used by an algorithm (un-shown) in the controller 200 to control the device control outputs 240 in order to completely orchestrate a safe occupant entry or exit of the vehicle 101. The device control outputs 240 include: an alarm that uses sound, light, vibration or any other sensory means to communicate the status of the system of the present invention 100 including whether it is safe or un-safe to exit the vehicle, or if the system is blocking exit or any other enunciation 241 to the occupant. The imaging device on the drivers side 242 warns oncoming traffic of the impending opening of a door 105 and emergence of an occupant on the pavement 104. The imaging device on the passenger side 243 also warns oncoming traffic of the impending opening of a door 105 and emergence of an occupant on the pavement 104. the door lock 244 and override control 245, allows the controller 200 to impede the occupant (un-shown) from opening the door and includes a way for the occupant to override the lock.

FIG. 3 describes the system learning cycle steps 300 programmed into the controller 200 to implement the function of the instant invention 100. The first step is to determine occupant characteristics 301 (weight, height Etc.) by use of the occupant ID sensor 202, then to reference an existing occupants profile with an occupant having the same characteristics or initiate a new occupant profile (un-shown) for an occupant with unique characteristics. Each time an occupant with recognized characteristics sits in the vehicle 101 and then exits the vehicle 101 their occupant statistical data is captured in a rolling memory 303 as each system input 200 is triggered. Occupant statistical data 303 consists of the time that passes between the triggering of any of the shift control in park 203, emergency brake 204, ignition switch 205, dome light 206, visor mirror light 207, cigarette lighter 208 rear view mirror 209 safety buckle 210, inside door handle proximity 211 or inside door handle 212 and the opening of the door sensed by the door position sensor 213. Once the data based on occupant experience with the vehicle inputs is taken it can be integrated with the data taken form vehicles of the same vehicle model using a weighted averaging 304 to select the sensor trip that is the best indicator of the time the occupant will exit the vehicle 305 and record this determination in the occupant profile 306 along with the average time between best sensor trip and the door opening 307.

Example 1

The present invention may be in use in a MODEL X vehicle. The model X has a proximity sensor at the location of the door handle. However, the door handle of the MODEL X vehicle is close to the steering wheel and the proximity sensor of all MODEL X vehicles experience occasional inadvertent activations. The learning cycle data for a specific occupant in a specific MODEL X vehicle will be taken into account by giving the proximity sensor input a lower weight when selecting which sensor is the best predictor of the occupant exiting the vehicle 101.

The characteristics that distinguish the best indicator of the time the occupant will exit the vehicle are:
1. An input trigger time of sufficient length so that the imaging devices can be turned on in enough time to warn oncoming traffic of the impending occupant exiting the vehicle.
2. Enough extra time so that the warning of oncoming traffic can be moved foreword to compensate for fast oncoming traffic and poor driving conditions.
3. A trigger input time that is repeatable.

FIG. 4, also shows the system operating cycle steps 400 which start with an occupant entering the automobile 101 the system determining the occupant identity 402, opening the occupant profile of the identified occupant 402, recovering the occupant trip of the best sensor that predicts the occupant is exiting the vehicle 403, modifying the time to turn on the imaging device depending on external inputs 405, activating the imaging device 406, activating the door lock 407 to prevent premature exiting and deactivating the door lock when the external and remote sensors indicate safety 408 and sufficient warning has been given to the oncoming traffic that the occupant is exiting the automobile 101 followed by deactivating the imaging device based upon door closure 213. The modification of the time to turn on the imaging device 405 may for instance be lengthened if the traffic speed increases, traffic is congested, visibility is poor, road surface is slippery Etc. The modification of the time to turn on the imaging device 405 may be reduced under good road conditions good visibility and ambient light, dry pavement conditions and moderate speed of oncoming traffic.

During the learning cycle steps 300 the controller 200 may use default times (un-shown) for performing the system operating cycle steps 320. After a set number of cycles through the learning cycle steps 300 with an occupant having an occupant profile (un-shown) the system will begin using the data from the occupant profile for operational timing during the system operating cycle steps 320. Concurrent operation of the system learning cycle steps 300 and the system operating steps 320 may be performed periodically to update the data in the operators profile with current client practices while not interrupting the normal operation of the system.

Although the terms and definitions used in the specification are intended to be read into the claims they are hot intended to limit the meets and bounds of the claims presented here below in any manner whatsoever.

We claim:

1. A system that warns one or more drivers of approaching vehicles in advance of one or more occupants that are about to enter or exit a parked vehicle, comprising:
a controller within the parked vehicle;
one or more sensors detecting an action of the one or more occupants of the parked vehicle that are performing normal preparations to exit or enter the parked vehicle, wherein the one or more sensors are in communication with the controller;
one or more imaging devices producing an image that is visible by the one or more drivers of the approaching vehicles; and
an occupant sensor detecting whether an occupant of the parked vehicle has an occupant profile and, if not, the system creates the occupant profile for the occupant, wherein the controller adjusts an the activation time of the imaging devices relative to historical data for each occupant profile, stored in a rolling memory;
wherein the one or more imaging devices are in communication with the controller;
wherein the controller activates the one or more imaging devices before the one or more occupants opens a door of the parked vehicle at the activation time learned by the historical data of the occupants routine, stored in the rolling memory, in preparation for entering or exiting the parked vehicle as measured by the one or more sensors, wherein the activation time is adjustable by the controller based on occupant statistical data which is stored in the rolling memory.

2. The system of claim 1, wherein: the one or more imaging devices projects a visible image on a surface for viewing by the one or more drivers of the approaching vehicles.

3. The system of claim 2, wherein: the surface for viewing the image is a portion of pavement for supporting the approaching vehicles and the parked vehicle.

4. The system of claim 3, further comprising: one or more external inputs that communicate conditions influencing an optimum activation time of the one or more imaging devices, wherein the one or more external inputs include at least one of the speed of traffic passing the parked vehicle, distance between the parked vehicle and oncoming traffic or passing traffic, an ambient light level, a weather condition, a road condition, a road configuration and a pavement condition.

5. The system of claim 4, wherein: the controller adjusts the activation time of the imaging devices relative to progress of the one or more occupants preparing to exit or enter the parked vehicle depending on the one or more external inputs.

6. The system of claim 5, wherein: the occupant sensor inputs include but are not limited to a weight, a height, an electronic ID, or another measure to identify the one or more occupants.

7. The system of claim 6, wherein: the occupant sensor inputs include but are not limited to a shift control position, an emergency brake, an ignition switch, a dome light, a visor mirror, a cigarette lighter, a rear view mirror position, a safety belt buckle, an inside door handle proximity, an inside door handle, a door position, a remote lock control, a door key lock and an outside door handle.

8. The system of claim 7, wherein: the controller activates the door lock upon activating the one or more imaging devices and deactivates the door lock when conditions are safe for exiting or entering the parked vehicle.

9. The system of claim 8, wherein: the controller activates a sensory alarm inside of the parked vehicle communicating to the one or more occupants with a light, a sound or a vibration.

10. The system of claim 9, wherein: the parked vehicle is selected from the group consisting of a personal vehicle, a commercial vehicle, a public service vehicle, a defense vehicle; a construction vehicle, an air travel vehicle, a public transit vehicle, a freight vehicle, a water travel vehicle, a rail transportation vehicle, a monorail, a hovercraft, a people-mover, a gondola, a lift and a recreational vehicle.

11. The system of claim 10, wherein: the controller is a microprocessor.

12. The system of claim 11, wherein: the visible image portrays a keep out area projected on the portion of the pavement by the one or more imaging devices.

13. The system of claim 1, wherein: the controller utilizes a learning algorithm to dynamically adjust a weighting factor assigned to each of the plurality of sensors based on a past behavior of the one or more occupants.

14. The system of claim 1, wherein: the controller is configured to actively control which imaging device, of the one or more imaging device, is activated in real time.

15. The system of claim 1, wherein: the controller is configured to actively change the visible image that is projected in real time.

16. The system of claim 1, wherein: the controller is configured to change the visible image based on the parked vehicle's environment and the one or more occupants' activity.

17. The system of claim 1, wherein: the controller includes an input device for communicating a custom image to the controller in order to replace the visible image.

18. The system of claim 12, wherein: the one or more external inputs are communicated wirelessly.

* * * * *